(12) United States Patent
Kim et al.

(10) Patent No.: US 11,661,083 B2
(45) Date of Patent: May 30, 2023

(54) VEHICLE AND METHOD OF CONTROLLING THE SAME

(71) Applicants: Hyundai Motor Company, Seoul (KR); Kia Motors Corporation, Seoul (KR)

(72) Inventors: NamGyun Kim, Gyeonggi-do (KR); Jaewoong Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 241 days.

(21) Appl. No.: 17/106,312

(22) Filed: Nov. 30, 2020

(65) Prior Publication Data

US 2021/0387645 A1 Dec. 16, 2021

(30) Foreign Application Priority Data

Jun. 11, 2020 (KR) .................. 10-2020-0071074

(51) Int. Cl.
*B60W 60/00* (2020.01)
*G08G 1/16* (2006.01)
*B60W 30/09* (2012.01)

(52) U.S. Cl.
CPC ........ *B60W 60/0016* (2020.02); *B60W 30/09* (2013.01); *G08G 1/16* (2013.01); *B60W 2420/42* (2013.01); *B60W 2420/52* (2013.01); *B60W 2554/00* (2020.02)

(58) Field of Classification Search
CPC ............ B60W 60/0016; B60W 30/09; B60W 2420/42; B60W 2420/52; B60W 2554/00; B60W 30/18145; B60W 30/18154; B60W 2552/53; B60W 30/0953; B60W 30/0956; B60W 2520/10; B60W 2554/4042; B60W 2554/806; B60W 2556/50; B60W 2554/4041; B60W 30/08; B60W 40/06; B60W 40/10; B60W 50/0097; B60W 2554/804; G08G 1/16; G08G 1/166; G08G 1/167; B60Y 2300/08

See application file for complete search history.

(56) References Cited

U.S. PATENT DOCUMENTS

| | | | |
|---|---|---|---|
| 6,337,637 B1 | 1/2002 | Kubota et al. | |
| 8,175,797 B2 | 5/2012 | Kogure | |
| 9,026,352 B2 | 5/2015 | Shimizu et al. | |
| 9,701,307 B1* | 7/2017 | Newman | B60W 30/095 |
| 2017/0001637 A1* | 1/2017 | Nguyen Van | G01S 13/87 |
| 2019/0220012 A1* | 7/2019 | Zhang | B60W 50/0225 |
| 2019/0351899 A1* | 11/2019 | Adam | B60W 30/095 |

FOREIGN PATENT DOCUMENTS

| | | |
|---|---|---|
| JP | 2015-140181 A | 8/2015 |
| JP | 2016-224563 A | 12/2016 |
| KR | 10-2018-0039700 A | 4/2018 |
| KR | 10-1865766 B1 | 6/2018 |

* cited by examiner

*Primary Examiner* — Jason Holloway
(74) *Attorney, Agent, or Firm* — Fox Rothschild LLP

(57) ABSTRACT

A vehicle is provided to avoid a collision with a target object located in front of the vehicle by predicting an expected traveling path of the target object. The vehicle also predicts the possibility of a collision with the target object.

22 Claims, 12 Drawing Sheets

FIG.9
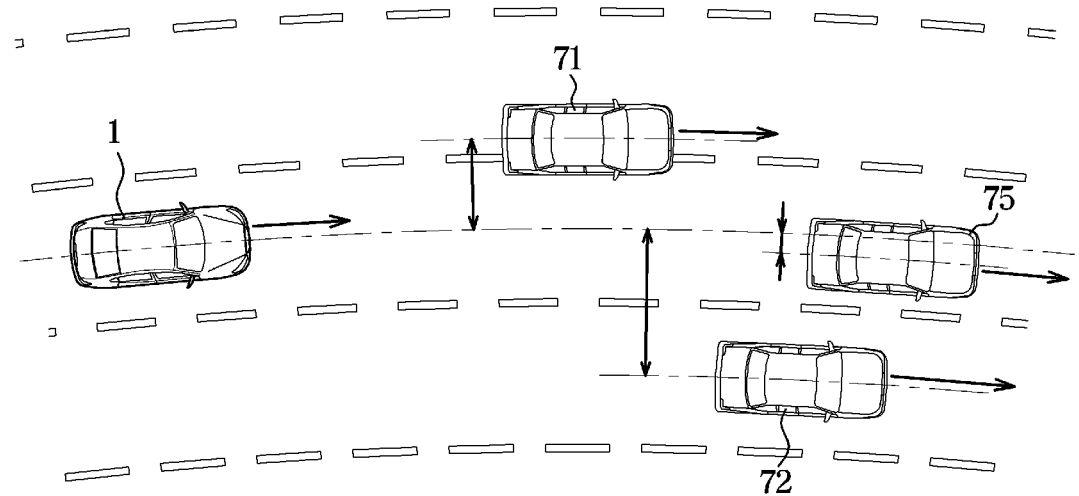
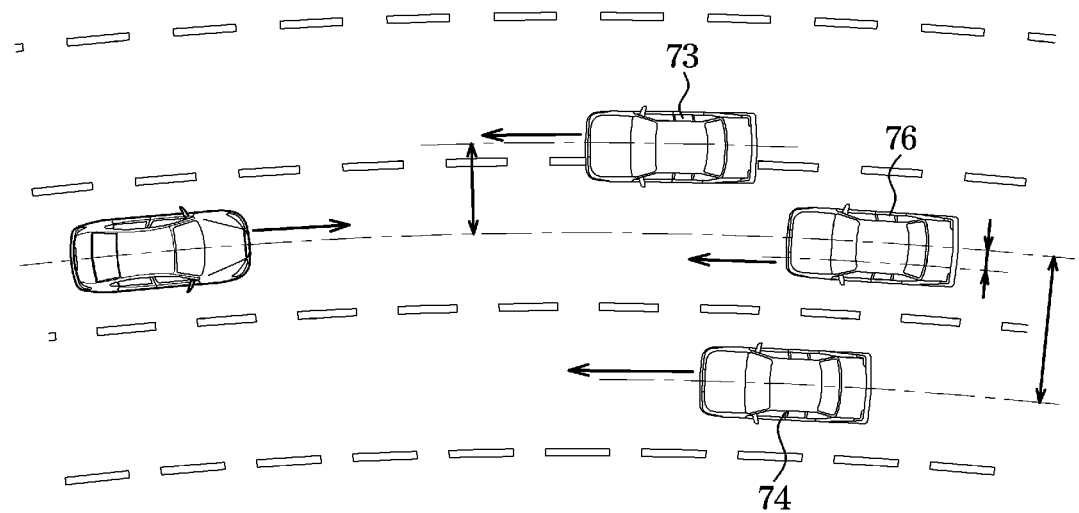

VEHICLE AND METHOD OF CONTROLLING THE SAME

CROSS-REFERENCE TO RELATED APPLICATION

This application is based on and claims priority under 35 U.S.C. § 119 to Korean Patent Application No. 10-2020-0071074, filed on Jun. 11, 2020, the disclosure of which is incorporated herein by reference.

BACKGROUND

1. Field of the Disclosure

The present disclosure relates to a vehicle for avoiding a collision by predicting a traveling path of a vehicle located in front of the vehicle, and a method of the controlling the same.

2. Description of the Related Art

Recently, as autonomous driving has been spotlighted for the convenience to drivers, various types of advanced driver assistance system (ADAS) have been developed. In particular, as the autonomous driving market is expected to enter a growth trend, research on autonomous driving is actively being conducted.

As an example, Adaptive Cruise Control (ACC) is being actively studied. The ACC is a system that allows a vehicle to travel while maintaining the velocity without a driver's manipulation when the driver sets a desired velocity. When a target object is present in front of the vehicle, a collision may be avoided by only predicting an expected traveling path of the target vehicle.

SUMMARY

Therefore, it is an object of the disclosure to provide a vehicle capable of avoiding a collision with a target object located in front of the vehicle by predicting an expected traveling path of the target object and predicting the possibility of a collision with the target object, and a method of controlling the same.

Additional aspects of the disclosure will be set forth in part in the description which follows and, in part, will be obvious from the description, or may be learned by practice of the disclosure. According to an aspect of the disclosure, a vehicle may include: a first sensor part configured to acquire vehicle traveling information including position information, velocity information, and heading direction information of a vehicle; a second sensor part configured to acquire target object traveling information including position information, velocity information, heading value information of a target object, and surrounding road information of the vehicle; a controller configured to: predict an expected traveling path of the vehicle based on the vehicle traveling information; determine a reliability of the expected traveling path of the vehicle based on a learning table that is generated by learning based on the expected traveling path of the vehicle, global positioning system (GPS) data of the vehicle, and an internal signal of the vehicle; confirm an expected traveling path of the target object in real time based on the target object traveling information when the reliability of the expected traveling path of the vehicle is greater than or equal to a predetermined threshold value; and operate the vehicle to avoid a collision between the vehicle and the target object based on the expected traveling path of the vehicle and the confirmed expected traveling path of the target object.

The controller may be configured to predict an absolute velocity of the target object based on the information acquired by the first sensor part and the information acquired by the second sensor part. The second sensor part may include a camera, a radar, and a Lidar, and the controller may be configured to: determine a first heading value of the target object using at least one of the camera, the radar, or the Lidar included in the second part based on the position of the target object; determine a second heading value of the target object based on the absolute velocity; and predict a heading direction of the target object based on the first heading value of the target object and the second heading value of the target object.

The controller may be configured to: calculate an offset between the target object and the expected traveling path based on the expected traveling path of the vehicle and the position information of the target object; determine a point in the expected traveling path closest to the target object as a collision point when the offset is less than a predetermined first value; and operate the vehicle to avoid a collision with the target object when a difference in times for the vehicle and the target object to reach the collision point is less than a predetermined second value.

The surrounding road information of the vehicle may include lane line information on both sides of the vehicle, and the controller may be configured to: calculate an offset between a left lane line or right lane line of the lane line information on the both sides of the vehicle and the target object; predict a second collision point between the vehicle and the target object when the offset is less than a predetermined first value; and operate a driving part to avoid a collision with the target object when a difference in times for the vehicle and the target object to reach the second collision point is less than a predetermined second value. The controller may be configured to: determine a weight related to a longitudinal absolute velocity of the target object according to a position of the target object; and determine a longitudinal moving direction of the target object based on the absolute velocity of the target object acquired from a predetermined previous point in time, the absolute velocity of the target object at a current point in time, and the weight.

The controller may be configured to: calculate a reference value based on a lateral absolute velocity of the target object and a heading direction of the target object, and in response to determining that the reference value is greater than or equal to a predetermined third value, determine that the target object performs traverse movement based on the absolute velocity of the target object acquired from a predetermined previous point in time, the absolute velocity of the target object at a current point in time, and the information acquired from the first sensor part.

The controller may be configured to: calculate a variation of the heading direction of the target object; calculate a variation of heading of the target object acquired from a predetermined previous point in time, and determine whether the target object maintains the heading direction based on the variation of the heading direction of the target object and the variation of the heading of the target object acquired from the predetermined previous point in time. The controller may be configured to determine whether an offset between the target object and the expected traveling path of the vehicle is maintained constant based on a variation of an offset between the target object and the left lane line Lh or right lane line Rh of the vehicle acquired from a predetermined previous point in time and a variation of the offset between the target object and the left lane line or right lane line of the vehicle acquired at a current point in time.

The controller may be configured to: calculate a variation of the heading direction of the target object; and determine whether the target object maintains the heading direction based on a variation of heading of the target object acquired from a predetermined previous point in time and a variation of the heading direction of the target object. The controller may be configured to: determine whether a heading direction of the target object is maintained; determine whether the offset between the target object and the expected traveling path of the vehicle is maintained constant; determine a state in which an offset from a left lane line or right lane line of the lane line information on the both sides of the vehicle to the target object is maintained constant as a first state; determine a state in which the heading direction of the target object is maintained as a second state; determine a state in which the offset between the expected traveling path of the vehicle and the target object is maintained constant as a third state; and determine an order of priority of type states including the first, second, and third states and predict the expected traveling path of the target object based on the order of priority.

According to another aspect of the disclosure, a method of controlling a vehicle may include: acquiring vehicle traveling information including position information, velocity information, and heading direction information of a vehicle; acquiring target object traveling information including position information, velocity information, heading value information of a target object, and surrounding road information of the vehicle; predicting an expected traveling path of the vehicle based on the vehicle traveling information; determining a reliability of the expected traveling path of the vehicle based on a learning table that is generated by learning based on the expected traveling path of the vehicle, global positioning system (GPS) data of the vehicle, and an internal signal of the vehicle; confirming an expected traveling path of the target object in real time based on the target object traveling information when the reliability of the expected traveling path of the vehicle is greater than or equal to a predetermined threshold value; and operating the vehicle to avoid a collision between the vehicle and the target object based on the expected traveling path of the vehicle and the confirmed expected traveling path of the target object.

The predicting of the expected traveling path of the target object in real time may include predicting an absolute velocity of the target object based on the vehicle traveling information and the target object traveling information. The avoiding of a collision between the vehicle and the target object may include: determining a first heading value of the target object using at least one of a camera, a radar, or a Lidar based on the position of the target object; determining a second heading value of the target object based on the absolute velocity; and predicting a heading direction of the target object based on the first heading value of the target object and the second heading value of the target object.

The predicting of the expected traveling path of the target object in real time may include: predicting an offset between the target object and the expected traveling path of the vehicle based on the expected traveling path of the vehicle and the position information of the target object; predicting a first collision point between the vehicle and the target object when the offset is less than a predetermined first value; and avoiding a collision between the vehicle and the target object when a difference in times for the vehicle and the target object to reach the first collision point is less than a predetermined second value.

The avoiding of a collision between the vehicle and the target object may include: acquiring the surrounding road information of the vehicle including lane line information on both sides of the vehicle; predicting an offset between a left lane line or right lane line of the lane line information on the both sides of the vehicle and the target object; predicting a second collision point between the vehicle and the target object when the offset is less than a predetermined first value; and operating the vehicle to avoid a collision with the target object when a difference in times for the vehicle and the target object to reach the second collision point is less than a predetermined second value.

The predicting of the expected traveling path of the target object in real time may include: predicting an offset between the target object and the expected traveling path of the vehicle based on the expected traveling path of the vehicle and the position information of the target object; predicting a first collision point between the vehicle and the target object when the offset is less than a predetermined first value; and avoiding a collision between the vehicle and the target object when a difference in times for the vehicle and the target object to reach the first collision point is less than a predetermined second value.

The avoiding of a collision between the vehicle and the target object may include: acquiring the surrounding road information of the vehicle including lane line information on both sides of the vehicle; predicting an offset between a left lane line or right lane line of the lane line information on the both sides of the vehicle and the target object; predicting a second collision point between the vehicle and the target object when the offset is less than a predetermined first value; and operating the vehicle to avoid a collision with the target object when a difference in times for the vehicle and the target object to reach the second collision point is less than a predetermined second value.

The predicting of the expected traveling path of the target object in real time may include: determining a weight related to a longitudinal absolute velocity of the target object according to a position of the target object; and determining a longitudinal moving direction of the target object on the basis of the absolute velocity of the target object acquired from a predetermined previous point in time, the absolute velocity of the target object at a current point in time, and the weight.

Additionally, the predicting of the expected traveling path of the target object in real time may include: calculating a reference value based on a lateral absolute velocity of the target object and a heading direction of the target object, and in response to determining that the reference value is greater than or equal to a predetermined third value, determining that the target object performs traverse movement based on the absolute velocity of the target object acquired from a predetermined previous point in time, the absolute velocity of the target object at a current point in time, and the vehicle traveling information.

The predicting of the expected traveling path of the target object in real time may further include determining whether the offset between the target object and the expected traveling path of the vehicle is maintained constant based on a variation of the offset between the target object and the expected traveling path of the vehicle acquired from a predetermined previous point in time and a variation of the offset between the target object and the expected traveling path of the vehicle acquired at a current point in time.

The predicting of the expected traveling path of the target object in real time may also include determining whether an offset between the target object and the expected traveling path of the vehicle is maintained constant based on a variation of an offset between the target object and the left lane line or right lane line of the vehicle acquired from a predetermined previous point in time and a variation of the offset between the target object and the left lane line or right lane line of the vehicle acquired at a current point in time. The predicting of the expected traveling path of the target object in real time may include: calculating a variation of a heading direction of the target object; and determining whether the target object maintains the heading direction based on a variation of heading of the target object acquired from a predetermined previous point in time and a variation of the heading direction of the target object.

Further, the predicting of the expected traveling path of the target object in real time may include: determining whether the heading direction of the target object is maintained; determining whether the offset between the target object and the expected traveling path of the vehicle is maintained constant; determining a state in which an offset from a left lane line or right lane line of the lane line information on the both sides of the vehicle to the target object is maintained constant as a first state; determining a state in which the heading direction of the target object is maintained as a second state; determining a state in which the offset between the expected traveling path of the vehicle and the target object is maintained constant as a third state; and determining an order of priority of type states including the first, second, and third states and predicting the expected traveling path of the target object based on the order of priority.

BRIEF DESCRIPTION OF THE DRAWINGS

These and/or other aspects of the disclosure will become apparent and more readily appreciated from the following description of the exemplary embodiments, taken in conjunction with the accompanying drawings of which:

FIG. 9 is a diagram illustrating an operation of determining whether an offset between a target object and an expected traveling path of a vehicle is maintained according to an exemplary embodiment;

DETAILED DESCRIPTION

Figure 1:
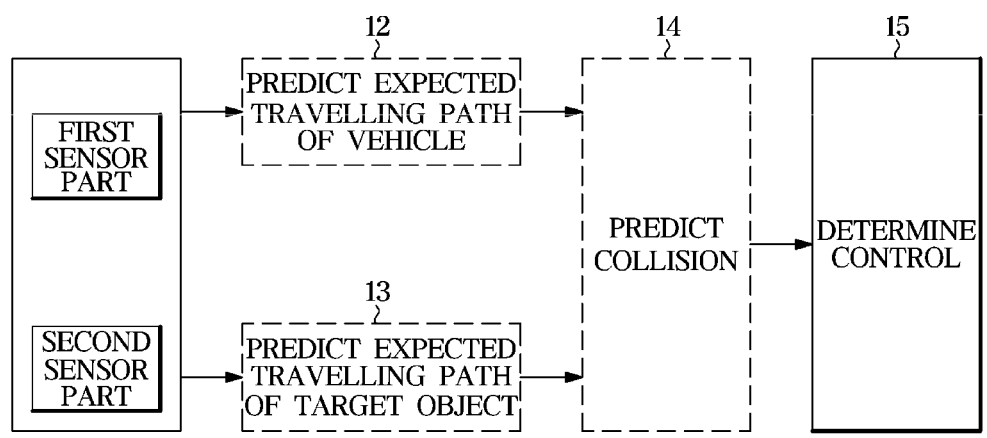
FIG. 1 is a diagram for describing a procedure of predicting an expected traveling path of a target object 2 located in front of a vehicle according to an exemplary embodiment.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like numerals refer to like elements throughout the specification. Not all elements of embodiments of the present disclosure will be described, and description of what are commonly known in the art or what overlap each other in the exemplary embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network. It will be further understood that the terms "comprises" and/or "comprising," when used in this specification, specify the presence of stated features, integers, steps, operations, elements, and/or components, but do not preclude the presence or addition of one or more other features, integers, steps, operations, elements, Although the terms "first," "second," "A," "B," etc. may be used to describe various components, the terms do not limit the corresponding components, but are used only for the purpose of distinguishing one component from another component. As used herein, the singular forms "a," "an" and "the" are intended to include the plural forms as well, unless the context clearly indicates otherwise. Reference numerals used for method steps are just used for convenience of explanation, but not to limit an order of the steps. Thus, unless the context clearly dictates otherwise, the written order may be practiced otherwise.

Hereinafter, the principles and exemplary embodiments of the disclosure will be described with reference to the accompanying drawings.

Figure 2:
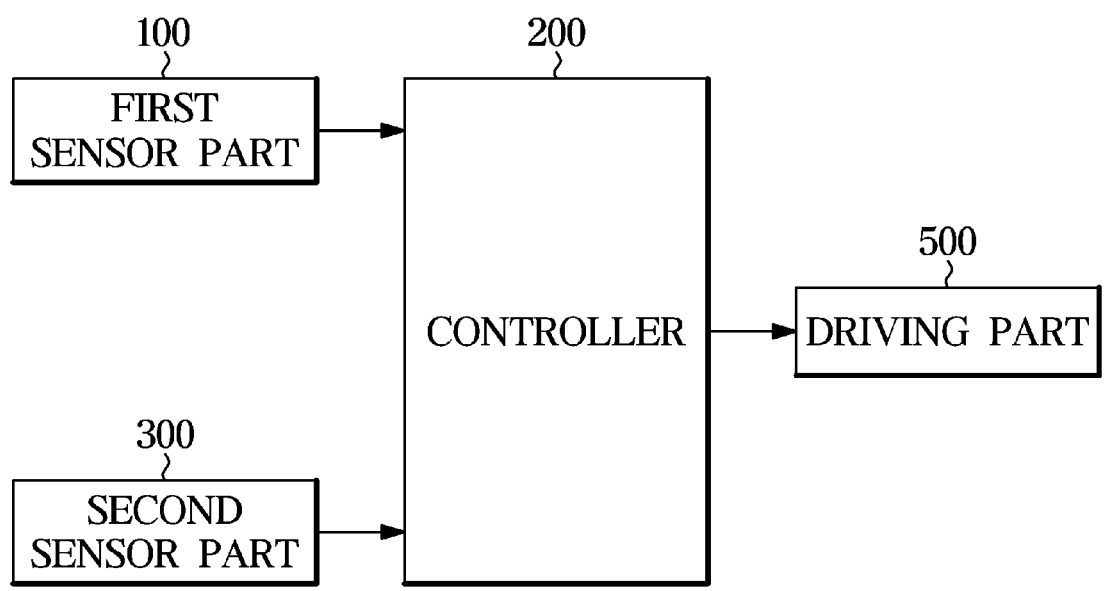
FIG. 2 is a control block diagram illustrating a vehicle according to an exemplary embodiment.

FIG. 1 is a diagram for describing a procedure of predicting an expected traveling path of a target object 2 located in front of a vehicle according to an exemplary embodiment. FIG. 2 is a control block diagram illustrating a vehicle according to an exemplary embodiment. Referring to FIGS. 1 and 2, a vehicle 1 may acquire traveling information of the vehicle 1 including position information of the vehicle 1, velocity information of the vehicle 1, and heading information of the vehicle 2 using a first sensor part 100.

A second sensor part 300 may be configured to acquire traveling information of the target object 2 including position information of the target object 2, velocity information of the target object 2, heading value information of the target object 2, and information about a surrounding road of the vehicle 1. The controller 200 may be configured to predict an expected traveling path of the vehicle 1 based on the vehicle traveling information (12), determine the reliability of the expected traveling path based on global positioning system (GPS) data of the vehicle 1 and the expected traveling path of the vehicle 1, determine an expected traveling path of the target object 2 based on the traveling information of the target object 2 when the reliability of the expected traveling path of the vehicle 1 is equal to or greater than a predetermined threshold (13), and operate a driving part 500 to avoid a collision with the target object 2 based on the expected traveling path of the vehicle 1 and the expected traveling path of the target object 2.

The driving part 500 may be configured to perform functions such as changing the direction of the vehicle 1 or adjusting the velocity. Specifically, the controller 200 may be configured to determine an absolute velocity of the target object 2 based on the traveling information of the vehicle 1 and the traveling information of the target object 2. The absolute velocity of the target object 2, different from a relative velocity of the target object 2, may be determined by correcting a predetermined value based on a relative velocity included in the traveling information of the target object 2, the traveling information of the vehicle, and the position of the target object 2. The reliability of the expected traveling path of the vehicle 1 may be determined based on the GPS data of the vehicle and the expected traveling path of the vehicle 1. In particular, a reliability table may be generated based on an error between the GPS data of the vehicle 1 and the expected traveling path of the vehicle 1, and may inserted into a logic such that the reliability according to a corresponding signal may be derived from the vehicle 1 at normal times.

First, a reliability learning reference signal is defined (Input), a reference signal learning section is divided, and a section according to the input signal is randomly learned. Then, the average of error accumulation may be updated to generate a reliability table. In particular, the average of error accumulation may be learned based on measurement data, and the reliability table may be selected according to the input signal. The reliability of the expected traveling path of the vehicle may be determined based on a learning table generated by pre-learning based on the expected traveling path of the vehicle, the GPS data of the vehicle, and the internal signal of the vehicle.

Once the reliability table is formed, the reliability may be derived in real time based on the reliability table. The reliability of the expected traveling path determined in real time may be compared with a predetermined threshold value, and in response to determining that the expected traveling path reliability of the vehicle is equal to or greater than the predetermined threshold value, the expected traveling path of the target object 2 may be predicted in real time based on the traveling information of the target object 2 (12). Particularly, the threshold value may vary according to the traveling state of the target object 2. The determining of the traveling state of the target object 2 may include determining a state in which an offset from a left lane line (Lh) or right lane line (Rh) of lane line information on both sides of the vehicle 1 to the target object 2 is maintained constant as a first state, determining a state in which a heading direction of the target object 2 is maintained as a second state, determining a state in which an offset between the expected traveling path of the vehicle 1 and the target object 2 is maintained constant as a third state, determining a state in which the target object 2 is stopped as a fourth state, and determining a state in which the target object 2 is traveling linearly as a fifth state. A minimum value required to confirm each traveling state may be determined as a corresponding threshold value. The offset may represent a distance to be measured.

In response to determining that the reliability value of the vehicle 1 is less than the threshold value, for example, when the vehicle 1 experiences a substantial change in movement direction and travels irregularly, the expected traveling path may not be properly predicted, and the reliability may be lowered. The reliability of the expected traveling path of the vehicle 1 being equal to or greater than the threshold value represents that the expected traveling path of the vehicle 1 is predictable.

The controller 200 may be configured to predict the expected traveling path of the vehicle 1 in real time (12), predict the expected traveling path of the target object 2 (13), predict a collision between the vehicle 1 and the target object 2 based on the expected traveling path of the vehicle 1 and the expected traveling path of the target object 2, and operate the driving part 500 to avoid the collision. The controller 200 may include a memory (not shown) configured to store data regarding an algorithm for executing the operations of the components of the vehicle 11 or a program that represents the algorithm, and a processor (not shown) that performs the above described operations using the data stored in the memory. At this time, the memory and the processor may be implemented as separate chips. Alternatively, the memory and the processor may be implemented as a single chip.

At least one component may be added or omitted to correspond to the performances of the components of the system shown in FIGS. 1 and 2. In addition, the mutual positions of the components may be changed to correspond to the performance or structure of the system. Some of the components shown in FIGS. 1 and 2 may refer to a software component and/or a hardware component, such as a Field Programmable Gate Array (FPGA) and an Application Specific Integrated Circuit (ASIC).

Figure 3:
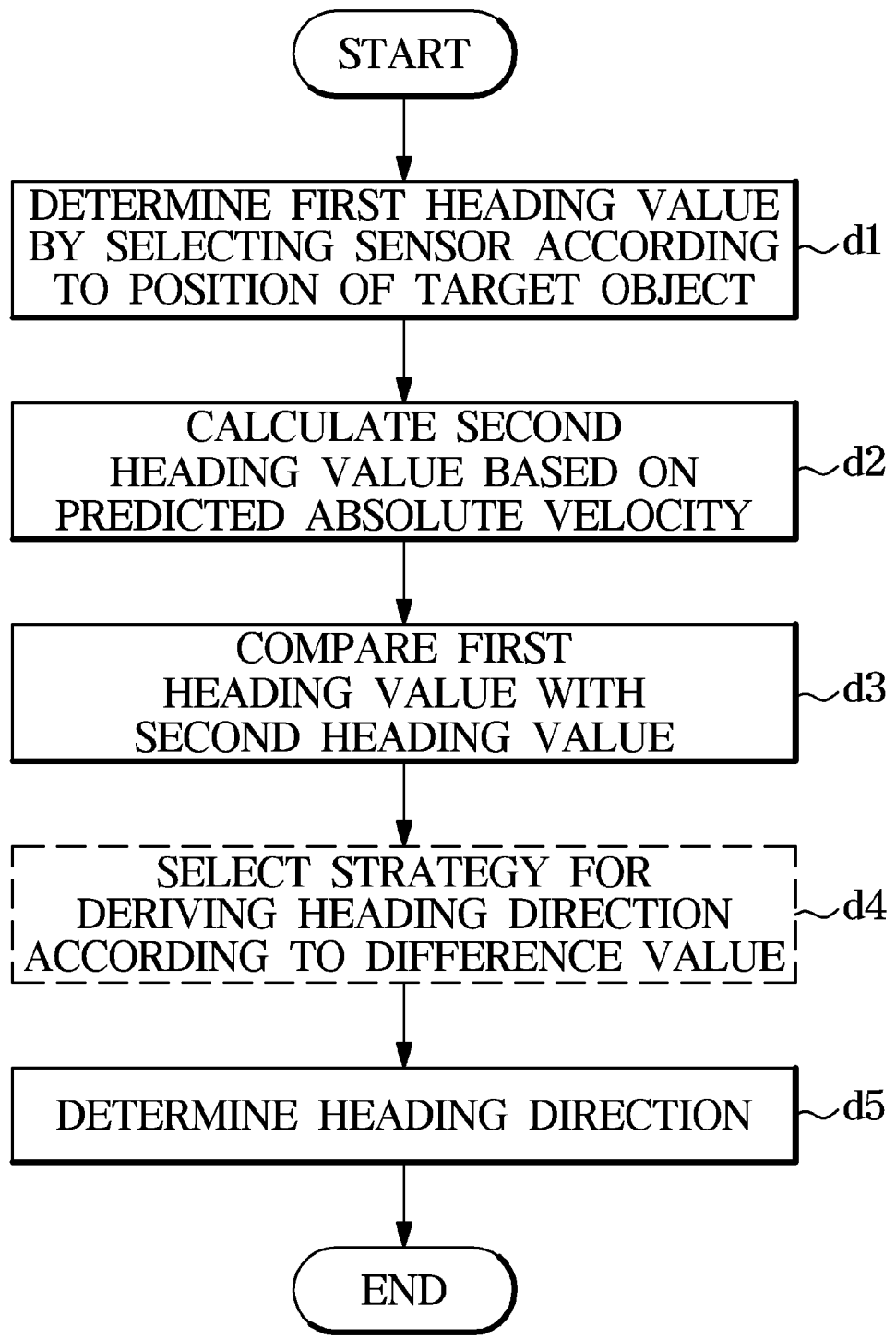
FIG. 3 is a flowchart showing an operation of determining a heading direction of a target object located in front of a vehicle according to an exemplary embodiment.

FIG. 3 is a flowchart showing an operation of determining a heading direction of the target object 2 in front of the vehicle according to an exemplary embodiment. The second sensor may include a camera, a radar, and a lidar, and the controller 200 may be configured to determine a first heading value d1 of the target object 2 using at least one of the second sensors based on the position of the target object 2 (d1), determine a second heading value d2 of the target object 2 based on the absolute velocity of the target object 2 (d2), compare the first heading value of the target object 2 with the second heading value of the target object 2 (d3), and predict the heading direction of the target object 2 based on the first heading value and the second heading value.

Specifically, the controller 300 may be configured to select at least one of the radar, the lidar, and the camera of the second sensor unit 300 according to the position of the target object 2 and select the first heading value (d1). The controller may be configured to predict the absolute velocity of the target object 2, and determine the second heading value based on the predicted absolute velocity (d2). The second heading value may be determined based on a ratio of the lateral absolute velocity of the target object 2 and the longitudinal absolute velocity of the target object 2. When the target object 2 may be located in front of the vehicle 1, the camera may be preferentially selected, and in other cases, a lateral radar may be selected to determine the first heading value. In particular, the sensing values of the sensors vary according to the position of the target object 2.

Thereafter, the controller 200 may be configured to compare the first heading value with the second heading value (d3) to select a strategy for deriving the heading direction (d4). Specifically, the controller 200, in response to determining that the difference between the first and second heading values substantially exceeds a specific threshold, may be configured to determine that the heading direction is not predictable, and in response to determining that the difference between the first and second heading values exceeds the specific threshold to an appropriate degree, mix the first and second heading values at a predetermined ratio and select a strategy for deriving the heading direction (d4). For example, when a camera is selected as a sensor for acquiring the heading value, since the camera is suitable for recognizing an inclined shape compared to a radar due to the image recognition characteristics, the specific threshold value may be set to be higher for a target object 2 in front of the vehicle. As the difference between the first heading value and the second heading value is larger, the second heading value may be preferentially determined. In response to determining that the difference between the first heading value and the second heading value is less than the threshold value, the first heading value may be determined as the heading direction.

Figure 4:
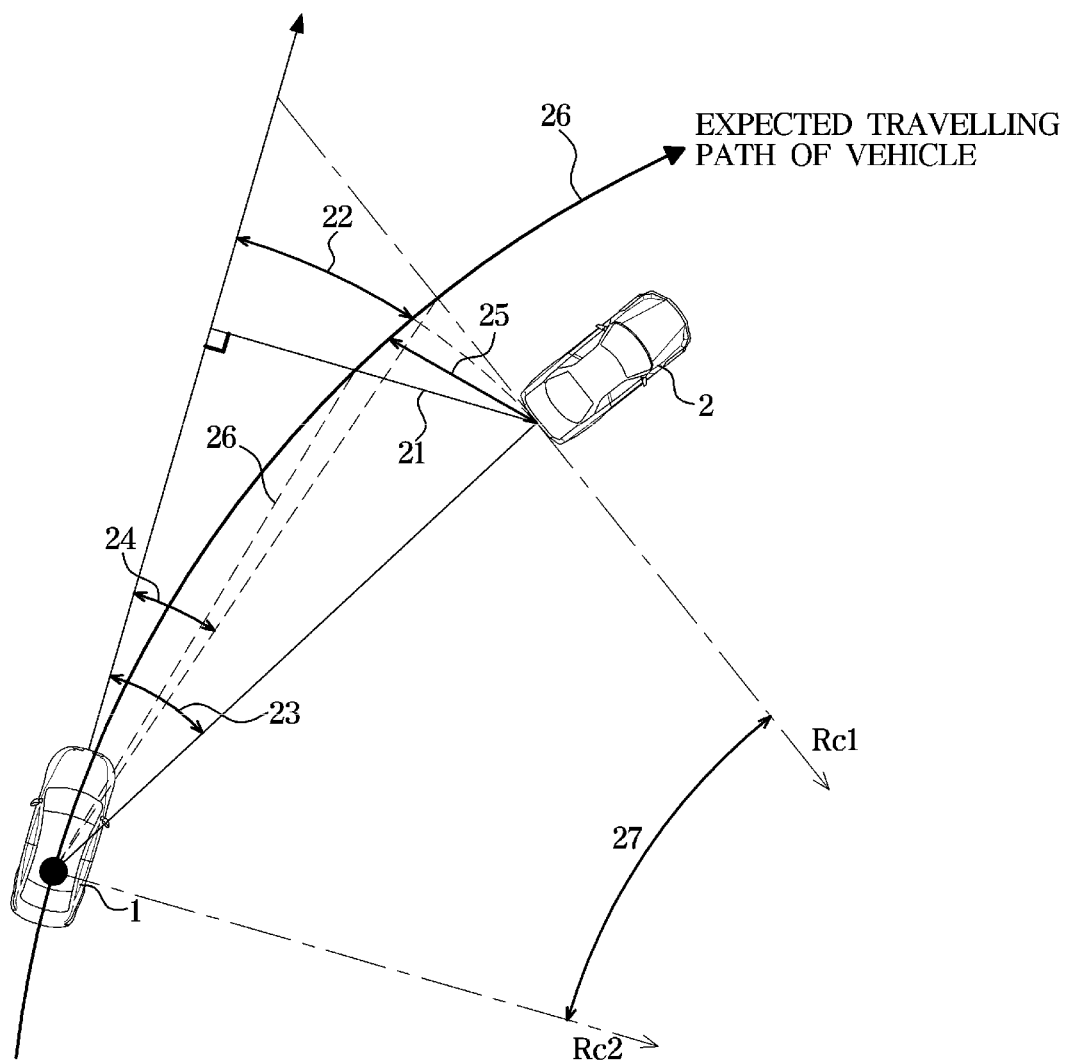
FIG. 4 is a diagram illustrating an operation of predicting an offset between a target object and an expected traveling path of a vehicle according to an exemplary embodiment.

FIG. 4 is a diagram illustrating an operation of predicting an offset between the target object 2 and the expected traveling path of the vehicle 1 according to an exemplary embodiment. The controller 200 may be configured to calculate an offset between the target object 2 and the expected traveling path of the vehicle 1 based on the expected traveling path of the vehicle 1 and the position information of the target object 2, and when the offset is less than a first predetermined value, determine a point in the expected traveling path closest to the target object 2 as a collision point, and in response to determining that a difference in times for the vehicle 1 and the target object 2 to reach the collision point is less than a second predetermined value, may be configured to operate the driving part 500 to avoid a collision with the target object 2.

Referring to FIG. 4, an offset between the target object 2 and an expected traveling path 26 of the vehicle 1 may be predicted based on the expected traveling path 26 of the vehicle 1 and the position of the target object 2. Assuming a line drawn in the direction in which the heading direction of the vehicle 1 is directed, a difference between a distance 21 from the line to the target object 2 and a distance 22 from the line to the expected traveling path 26 of the vehicle 1 represents an offset 25 between the target object 2 and the expected traveling path 26 of the vehicle 1. In this case, the distance 22 from the line to the expected traveling path 26 of the vehicle 1 may be expressed as a product of an angle 24 formed by the expected traveling path 26 of the vehicle 1 and the line and the distance between the vehicle and the target object.

When the offset between the target object 2 and the expected traveling path 26 of the vehicle 1 is less than a predetermined first value, the vehicle 1 and the target object 2 may be predicted to collide with each other. The collision point refers to a point in the expected traveling path 26 of the vehicle 1 at which a collision with the target object 2 is predicted to occur. The difference between a time taken for the vehicle 1 to reach the collision point and the time taken for the target object 2 to reach the collision point may be calculated, and in response to determining that the difference is less than a predetermined value, the vehicle 1 and the target object 2 are determined to collide with each other, and the controller 200 may be configured to operate the driving part 500 of the vehicle 1.

Particularly, the distance 22 between the line drawn in the direction in which the heading direction is directed and the expected traveling path 26 of the vehicle 1 may be calculated by obtaining an angle formed between the line drawn in the direction in which the heading direction of the vehicle is directed and a point expected as a collision point in the expected traveling path 26 of the vehicle 1 with respect to the vehicle 1, and multiplying the angle by the distance from the vehicle 1 to the target object 2. The distance 21 between the line drawn in the direction in which the vehicle is headed and the target object 2 may be determined based on a distance between the vehicle 1 and the target object 2 and an angle 23 formed between the line drawn in the direction in which the heading direction is directed and the target object 2.

The distance 21 between the line and the target object 2 may be obtained by multiplying the distance between the vehicle 1 and the target object 2 by a sine value. In this case, an angle input into the sign value refers to the angle 23 formed between the line drawn in a direction in which the head direction of the vehicle 1 is directed and the target object 2 with reference to the vehicle 1. In particular, the angle 24 from the line to the point expected as a collision point may be half of an angle 27 formed between a line Rc1 passing through the target object 2 and a line Rc2 passing through the vehicle 1 from the line drawn in the direction in which the heading direction of the vehicle 1 is directed. As will be described below, when the value of the offset 25 is maintained constant, the offset between the expected traveling path of the vehicle 1 and the target object 2 may be determined to be maintained constant. In particular, the distance between the target object 2 and the expected traveling path of the vehicle 1 may be obtained using a variable filter that receives a signal of the vehicle 1 as an input.

Figure 5:
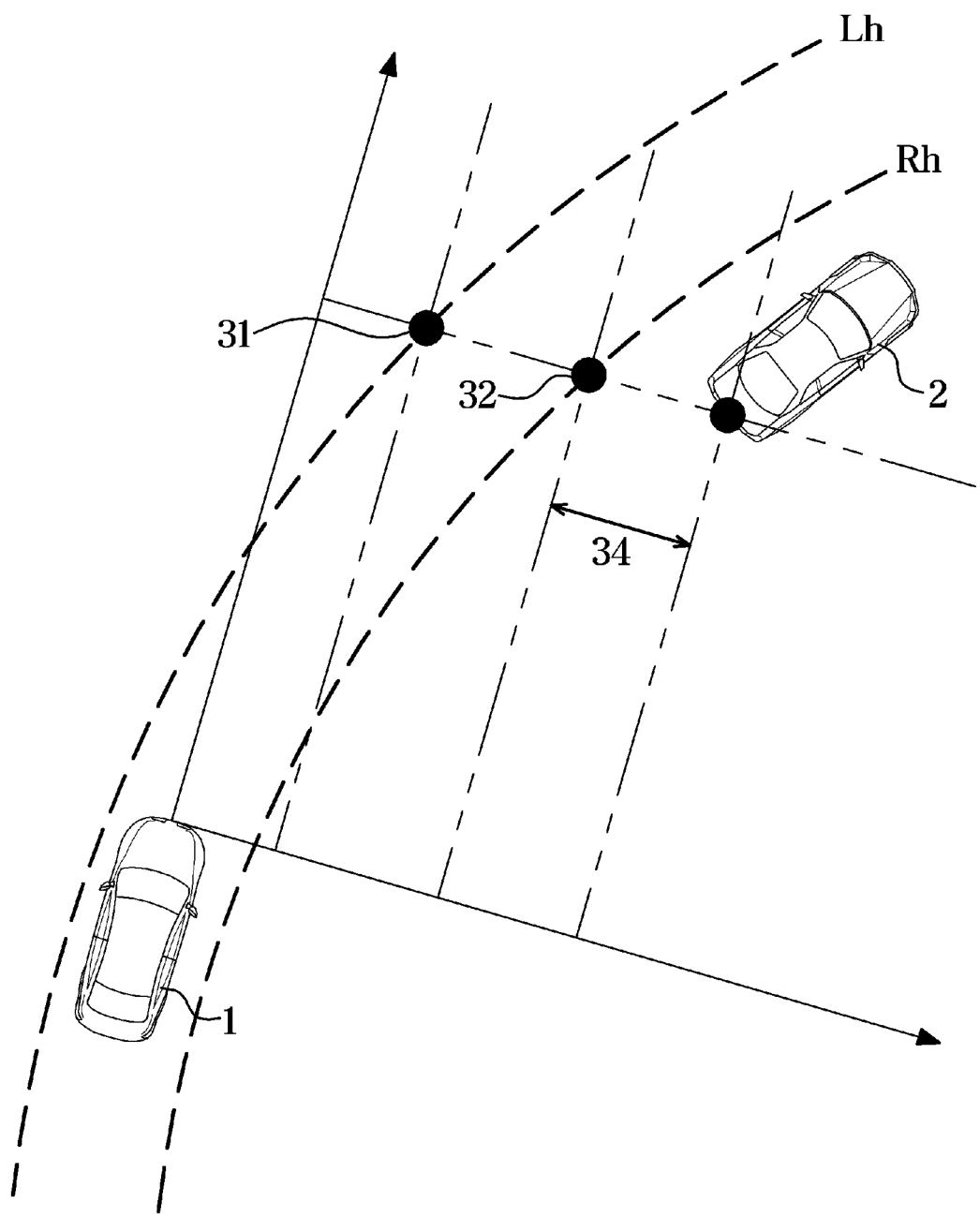
FIG. 5 is a diagram illustrating an operation of predicting an offset between a target object and lane lines on both sides of a vehicle according to an exemplary embodiment.

FIG. 5 is a diagram illustrating an operation of predicting an offset between the target object and lane lines according to an exemplary embodiment. The information about the surrounding road of the vehicle 1 acquired by the second sensor part 300 may include information about lane lines on both sides of the vehicle 1, and the controller 200 may be configured to calculate an offset from a left lane line Lh or right lane line Rh included in the information about lane lines on both sides of the vehicle 1 to the target object 2. In response to determining that the offset is less than a predetermined first value, the controller 200 may be configured to determine a point in the left lane line Lh or right lane line Rh closest to the target object 2 as a second collision point, and in response to determining that the difference in times for the vehicle 1 and the target object 2 to reach the second collision point is less than a second predetermined value, operate the driving part 500 to avoid a collision with the target object 2.

Specifically, information about lane lines on both sides of the vehicle 1 may be acquired from the second sensor part 300, and an offset from a left lane line Lh or right lane line Rh on the both sides of the vehicle 1 to the target object 2 may be calculated. For example, when the target object 2 is located on the right side of the right lane line of the vehicle 1, an offset 34 between the right lane line and the target object 2 may be calculated to acquire an offset between a specific point in the right lane line and the target object 2. When the target object 2 is located on the left side of the left lane line of the vehicle 1, an offset between the left lane line and the target object 2 may be acquired. When the offset is less than a predetermined first value, a point in the left lane line Lh or right lane line Rh closest to the target object 2 may be determined as a second collision point 31 or 32. In particular, in response to determining that the difference in times taken for the vehicle 1 and the target object 2 to reach the second collision point 31 or 32 is less than a second predetermined value, a control may be performed to avoid a collision with the target object 2.

Figure 6:
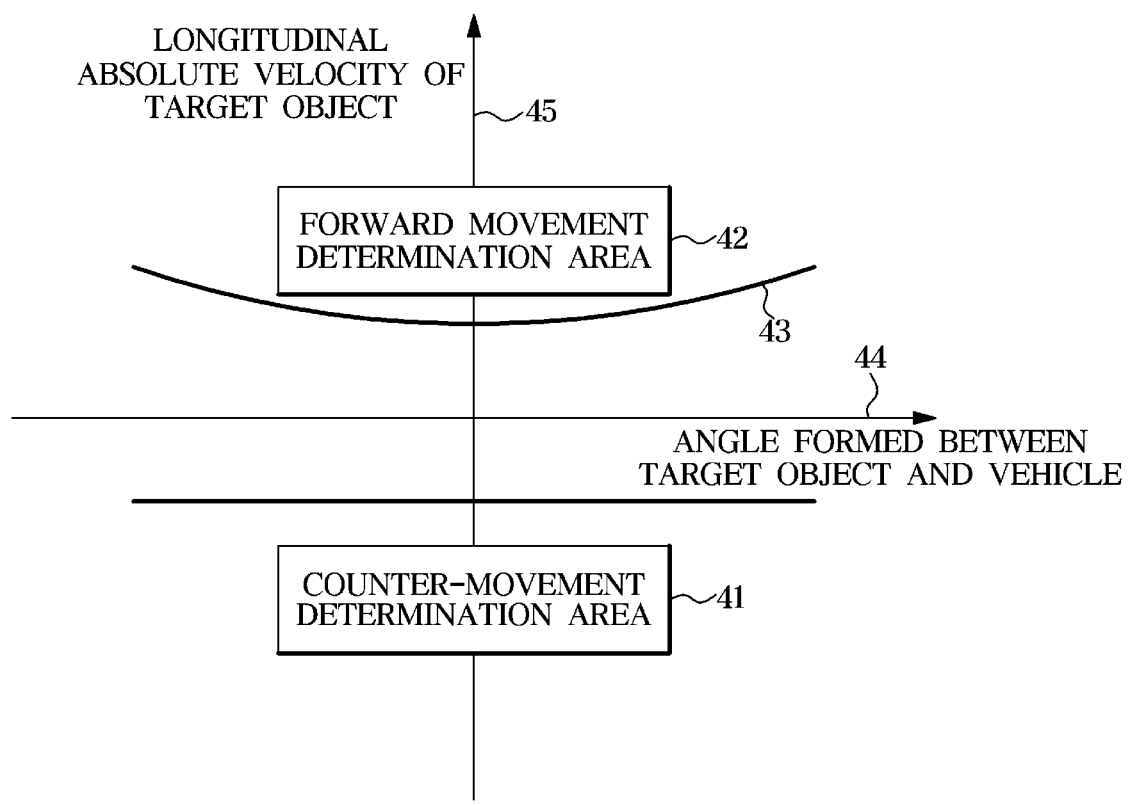
FIG. 6 is a diagram illustrating an operation of determining a type of longitudinal movement of a target object according to an exemplary embodiment.

FIG. 6 is a diagram illustrating an operation of determining the type of longitudinal movement of the target object 2 according to an exemplary embodiment. The controller 200 may be configured to determine a weight related to a longitudinal absolute velocity of the target object 2 according to the position of the target object 2, and determine a longitudinal moving direction of the target object 2 based on the absolute velocity of the target object 2 acquired from a previous point in time, the absolute velocity of the target object 2 at a current point in time, and the weight.

Specifically, referring to FIG. 6, the controller 200 may be configured to determine the weight related to the longitudinal absolute velocity of the target object 2 according to the position of the target object 2. For example, as the angle between the target object 2 and the vehicle 1 increases, the cognitive ability of the sensor may decrease. In particular, a higher weight may be assigned when determining the range of a forward movement determination area for accurate determination. In response to the angle between the target object 2 and the vehicle 1 increasing, the weight may be set to be higher to increase the threshold value, and only when the longitudinal absolute velocity of the target object 2 is measured high since the threshold value increases, the target object 2 may be determined to move forward.

Particularly, the threshold value corresponds to a value based on the weight and serving as a criterion for determining whether the target object corresponds to a forward movement or a counter movement. Since a counter-movement determination area 41 is generally formed in a large range, movement in the opposite direction to the vehicle 1 may be determined as a counter-movement regardless of the angle formed between the vehicle 1 and the target object 2. In this case, Hysteresis (concept of Age) may be used to determine forward movement or counter movement. For example, assuming that the target object 2 traveling in the opposite direction to the vehicle 1 is measured to travel at a relative velocity of −100 at a certain point in time, and after a certain period of time, the target object 2 performs a U-turn and travels at an absolute velocity of +10, and the vehicle 1 travels at an absolute velocity of +120, the absolute velocity of the target object 2 calculated by the vehicle 1 is −110. Although the vehicle 1 and the target object 2 currently travel in the same direction (forward movement), the target object 2 may be determined to travel in the opposite direction (counter-movement) only when numerically determined.

Accordingly, such a limitation may be eliminated using the concept of Hysteresis. Hysteresis (i.e., Hysteresis phenomenon) represents predicting the state of a specific point in time with reference to a phenomenon before the specific point of time. In other words, based on information acquired from a predetermined previous point in time and information at the current point in time, a change in velocity of the target object 2 may be observed for a certain period of time to find out that the velocity has decreased and measure that the velocity is gradually changing, and thus, the controller 200 may be configured to predict that the direction of the target object 2 is changed.

The longitudinal absolute velocity of the target object is set as a vertical axis 45, the angle between the target object 2 and the vehicle 1 is set as a horizontal axis 44, the angle formed by the target object 2 and the vehicle 1 according to the position of the target object 2 is acquired, and the longitudinal absolute velocity of the target object 2 is acquired, and whether the target object 2 corresponds to the forward movement determination area 42 or the counter movement determination area 41 may be determined based on information acquired from a predetermined previous point in time, the absolute velocity of the target object 2 at the current point in time, and the weight.

Figure 7:
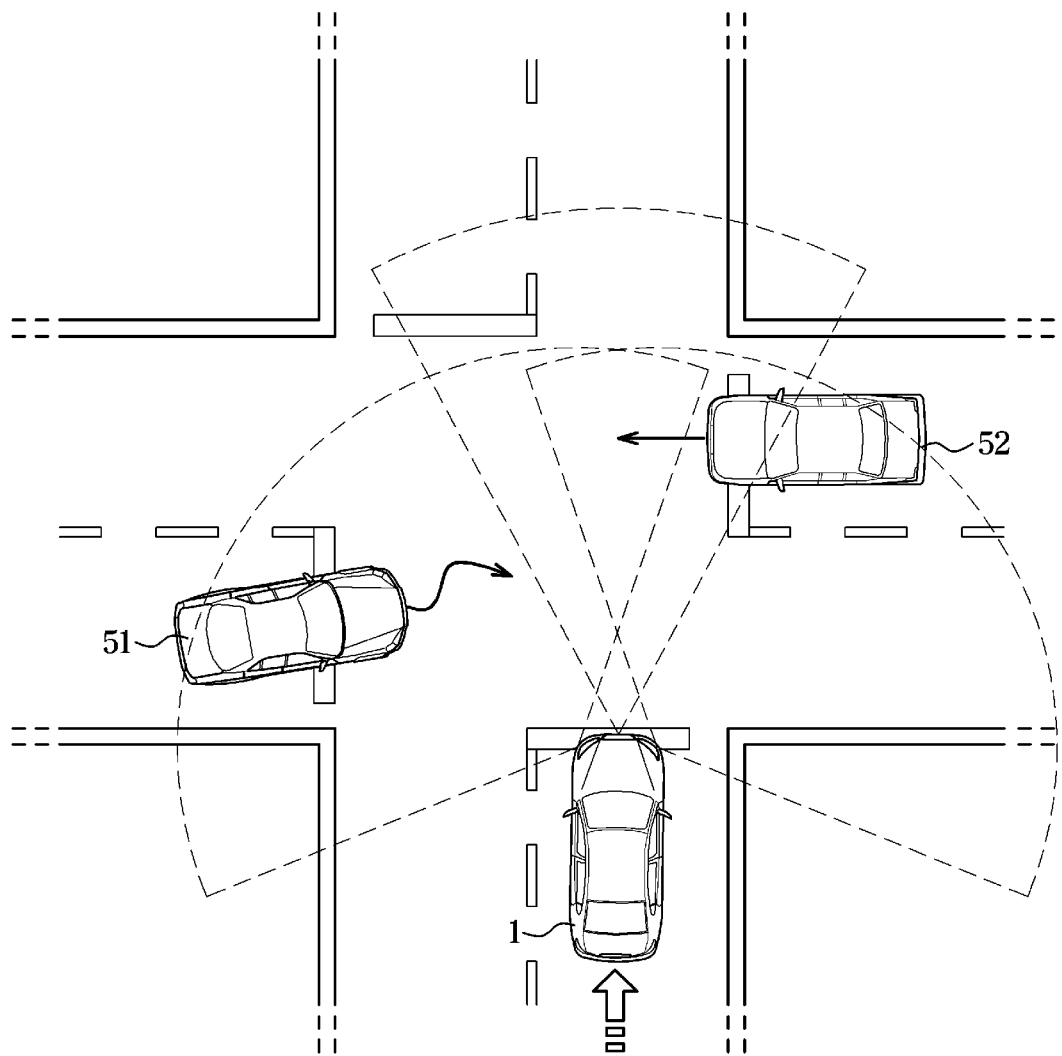
FIG. 7 is a diagram illustrating an operation of determining whether a target object performs lateral movement according to an exemplary embodiment.

FIG. 7 is a diagram illustrating an operation of determining whether the target object performs lateral movement according to an exemplary embodiment. The controller 200 may be configured to calculate a reference value based on the lateral absolute velocity of the target object and the heading direction of the target object, and in response to determining that the reference value is equal to or greater than a third predetermined value, be configured to determine that the target object 2 performs traverse movement based on the absolute velocity of the target object acquired from a predetermined previous point in time, the absolute velocity of the target object at the current point in time, and information acquired from the first sensor part 100.

Referring to FIG. 7, the reference value is determined based on the lateral absolute velocity and the heading direction of the target object. In response to determining that the reference value is equal to or greater than the third predetermined value, the target object 52 may be determined to perform traverse movement. In particular, when the reference value is less than the third predetermined value, the traverse movement may be inaccurately determined. When the reference value is greater than or equal to the third predetermined value, the performance of the traverse movement may be performed using the concept of Hysteresis. Whether a traverse movement is performed may be determined based on the absolute velocity of the target object 52 acquired from a predetermined previous point in time, the absolute velocity of the target object 52 at the current point in time, and the travelling information of the vehicle 1.

For example, when the vehicle is turning, the angle between the target object and the vehicle changes substantially over time, and thus it is meaningless to determine whether the target object performs traverse movement, and when the vehicle 1 is turning in a large radius from a predetermined previous point in time, the angle formed between the vehicle and the target object continuously changes and the velocity also changes, and thus it is not determined that the target object is performing traverse movement. When the velocity is greater than a value acquired by multiplying the longitudinal absolute velocity by a certain ratio, the vehicle 1 does not have a rapid movement, and the path of the vehicle 1 is predicted as a straight path, it is determined that a traverse movement is performed. In particular, the reference value may be compared with the threshold value to be finally determined. FIG. 7 also illustrates a target object 51 for which a traverse movement is determinable even with a low accuracy. The determination may be performed by calculating a reference value for inaccurate determination of traverse movement based on predicted longitudinal/lateral absolute velocity, and applying the reference value to the concept of Hysteresis.

Figure 8:
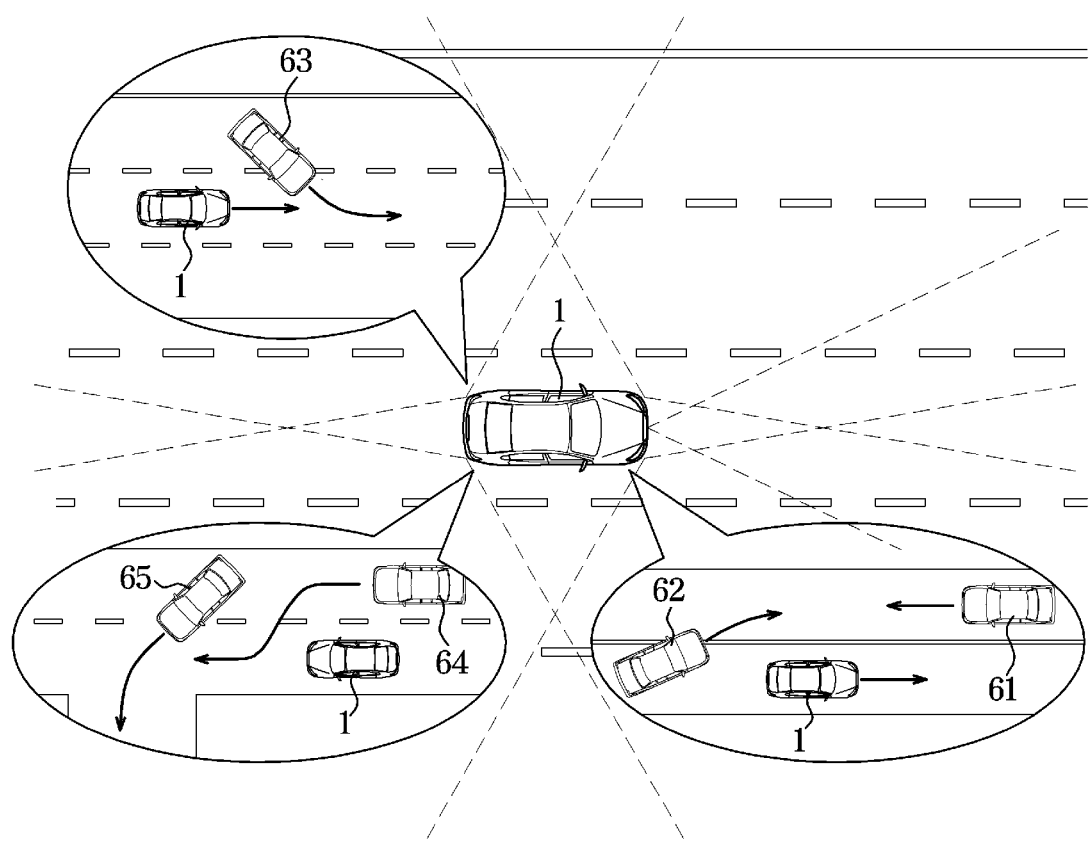
FIG. 8 is a diagram illustrating an operation of determining whether a heading direction of a target object is maintained according to an exemplary embodiment.

FIG. 8 is a diagram illustrating an operation of determining whether a heading direction of the target object is maintained according to an exemplary embodiment. The controller 200 may be configured to calculate a variation of the heading direction of the target object, calculate a variation of heading of the target object acquired from a previously determined point in time, and determine whether the target object 2 maintains the heading direction based on the variation of the heading direction of the target object and the variation of heading of the target object acquired from a predetermined previous point in time.

Specifically, referring to FIG. 8, a first target object 63 having travelled in the same direction as the vehicle 1 stops maintaining the heading direction. The controller 200 may be configured to calculate a variation of heading of the first target object 63 acquired from a predetermined previous point in time and a variation of the heading direction of the first target object 63, and based on whether the heading direction of the first target object 63 has been changing since a previous point in time and how much the heading direction of the first target object 63 has changed, determine that the heading direction of the first target object 63 is not currently maintained. In the case of a second target object 62, FIG. 8 shows that the second target object 62 changes the heading direction toward the next lane while on the travel from the rear of the vehicle 1. In this regard, the controller 200 of the vehicle 1 may be configured to calculate that the heading direction of the second target object 62 has been changing from a predetermined previous point in time and still changes even at a current point in time thus determining that the second target object 2 is changing the heading direction.

A third target object 61 is traveling in the opposite direction to the vehicle 1, and maintaining a constant the heading direction from a predetermined previous point in time to a current point in time, and corresponds to an example in which the vehicle 1 determines that the third target object 61 maintains the heading direction. A fourth target object 64 corresponds to an example in which the controller 200 calculates that the fourth target object 64 is traveling in the same direction as the vehicle 1 and has been changing the heading direction from a predetermined previous point in time, observes that the heading direction of the fourth target object 64 is currently changing, and determines that the heading direction is not maintained. In the case of a fifth target object 65, since the fifth target object 65 is turning while the vehicle 1 is traveling, the heading direction of the fifth target object 65 may be determined to have been continuously changing from a predetermined previous point in time to the current point in time and thus the heading direction is maintained, and in this case, the fifth target object 65 may be determined to be turning.

When a vehicle is turning, the angle between a target object and a vehicle changes substantially over time, and thus the reliability of calculating a variation of heading may not be easily ensured due to the limited performance of the camera and the radar. A method of calculating a reference value for determining maintenance of the heading direction has a requirement that a variation of the heading direction is less than or equal to a specific threshold value, the vehicle 1 does not have an abrupt movement, and an expected traveling path of the vehicle 1 is a straight path as a whole. A method of calculating a reference value for determining whether a target object is turning has a requirement that a variation of heading of the target object is greater than or equal to a specific threshold value, the vehicle 1 does not have an abrupt movement, and the path of the vehicle 1 is a straight path as a whole.

FIG. 9 is a diagram illustrating an operation of determining whether an offset between a target object 2 and an expected traveling path of a vehicle 1 is maintained. Referring to FIG. 9, offsets between vehicles 71, 72, and 75 moving forward in the same direction as the vehicle 1 and the expected traveling path of the vehicle 1 may be determined. In response to determining that the offsets between the vehicles 71, 72, and 73 moving forward in the same direction as the vehicle 1 and the expected traveling path of the vehicle 1 are constant, the offset from the expected traveling path of the vehicle 1 may be determined to be maintained constant. Offsets between vehicles 73, 74, and 76 moving in the opposite direction to the vehicle 1 and the expected traveling path of the vehicle 1 may be determined, and when the offsets between vehicles 73, 74, and 76 moving in the opposite direction to the vehicle 1 and the expected traveling path of the vehicle 1 are constant, the offsets from the expected traveling path of the vehicle 1 may be determined to be maintained constant.

When determining whether the offset is maintained, the concept of Hysteresis may be used. In other words, when the distances between the vehicles 71, 72, 73, 74, 75, and 76 acquired from a predetermined previous point in time and the expected traveling path of the vehicle 1 are constant with an error less than a specific value, it may be determined that the offsets are maintained.

In particular, the method of determining whether the offset is maintained has a requirement that a variation of the offset from the expected traveling path of the vehicle 1 is less than or equal to a specific threshold value, the recognized target object 2 is within a specific range (when the position of the target object 2 is too far. prediction accuracy may be poor and the determination may be meaningless to the system), and the expected traveling path of the vehicle 1 is not predicted to make a significantly large a turn. When the vehicle 1 is turning, the angle between the target object 2 and the vehicle 1 greatly changes over time, and thus the reliability of calculating the variation of the offset from the expected traveling path of the vehicle 1 is not easily ensured due to the limited performance of the camera and the radar.

Figure 10:
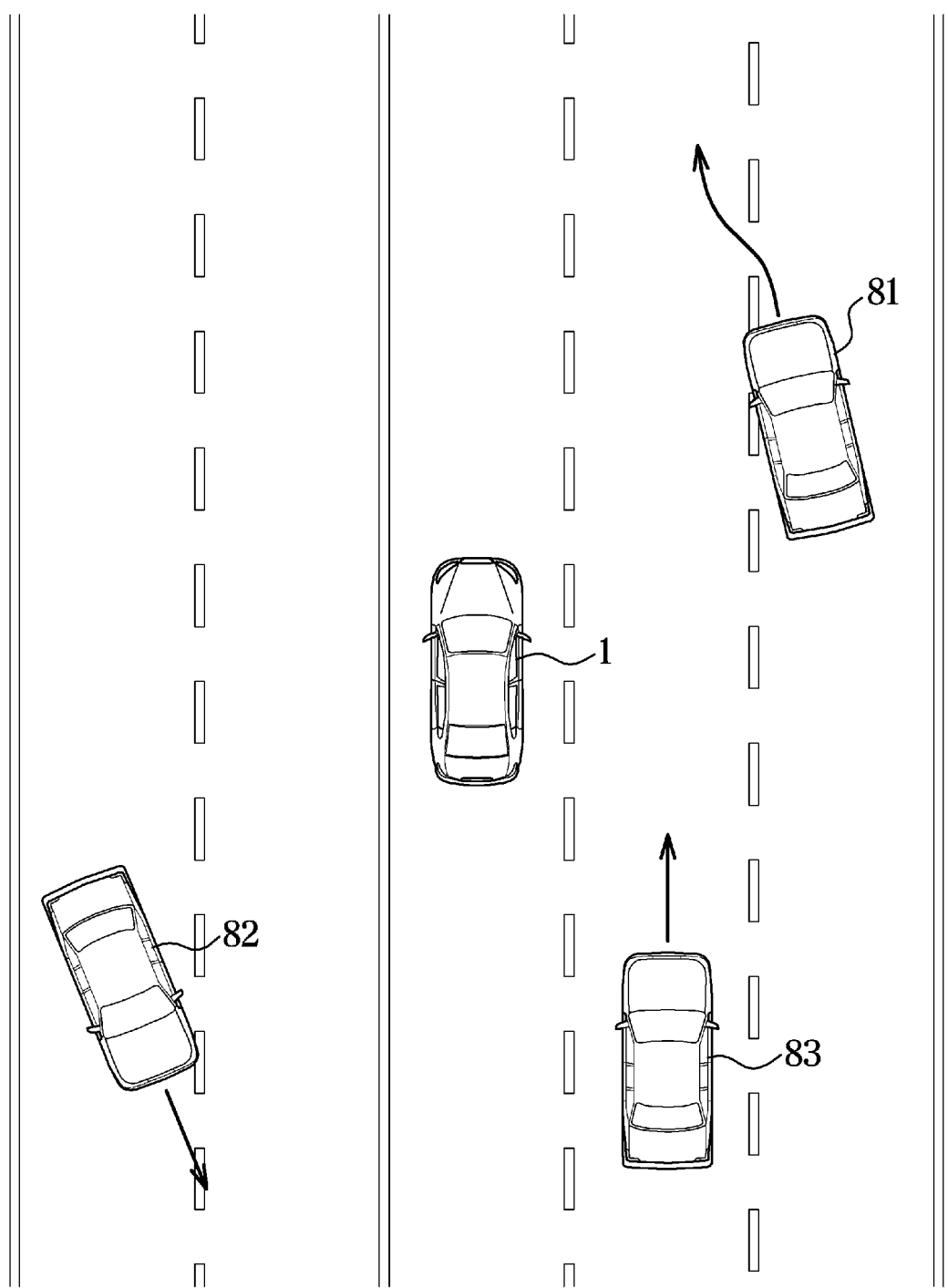
FIG. 10 is a diagram illustrating an operation of determining whether an offset between a target object and lane lines on both sides of a vehicle is maintained according to an exemplary embodiment.

FIG. 10 is a diagram illustrating an operation of determining whether an offset between the target object 2 and lane lines on both sides of the vehicle 1 is maintained. Referring to FIG. 10, position information of vehicles 81 and 83 moving in the same direction as the vehicle 1 is acquired, and whether left and right lane lines of the vehicle 1 are parallel to each other may be determined (e.g., the similarity of cubic coefficients of lane lines on both sides of the recognized 1 may be compared). When the condition for determining parallel state, such as a curvature change (a third order term), a curvature (a second order term), and a slop at a starting position of a lane line (a first order term), is satisfied, lanes may be virtually generated using a method of adding a lane width to the current position (e.g., the prediction of the lane width is determined based on the offset between the left lane line Lh or right lane line Rh and the vehicle 1 from the starting position).

Whether the offset between the target object 2 and the expected traveling path of the vehicle 1 is maintained constant may be determined based on a variation of the offset between the left lane line or right lane line of the vehicle 1 and the target object 2 acquired from a predetermined previous point in time and a variation of the offset between the left lane line or right lane line of the vehicle 1 and the target object 2 at a current point in time.

A lane on which the target object 2 is located may be estimated. A method of determining whether the lane lines on both sides of the vehicle 1 and the target object 2 maintain the offset has a requirement that a corrected offset value of the target object 2 with the left and right lane lines is less than or equal to a specific threshold, a variation of offset between the left lane line Lh or right lane line Rh of the vehicle 1 and the target object 2 is equal to or greater than a specific threshold, and the lane width is equal to or greater than a specific proportional amount of the vehicle width of the target object. Similar to the above, the calculation method may be provided using the method of Hysteresis. As a result, whether the offset between the lane lines on both sides of the vehicle 1 and the target object 2 is maintained may be determined.

Figure 11:
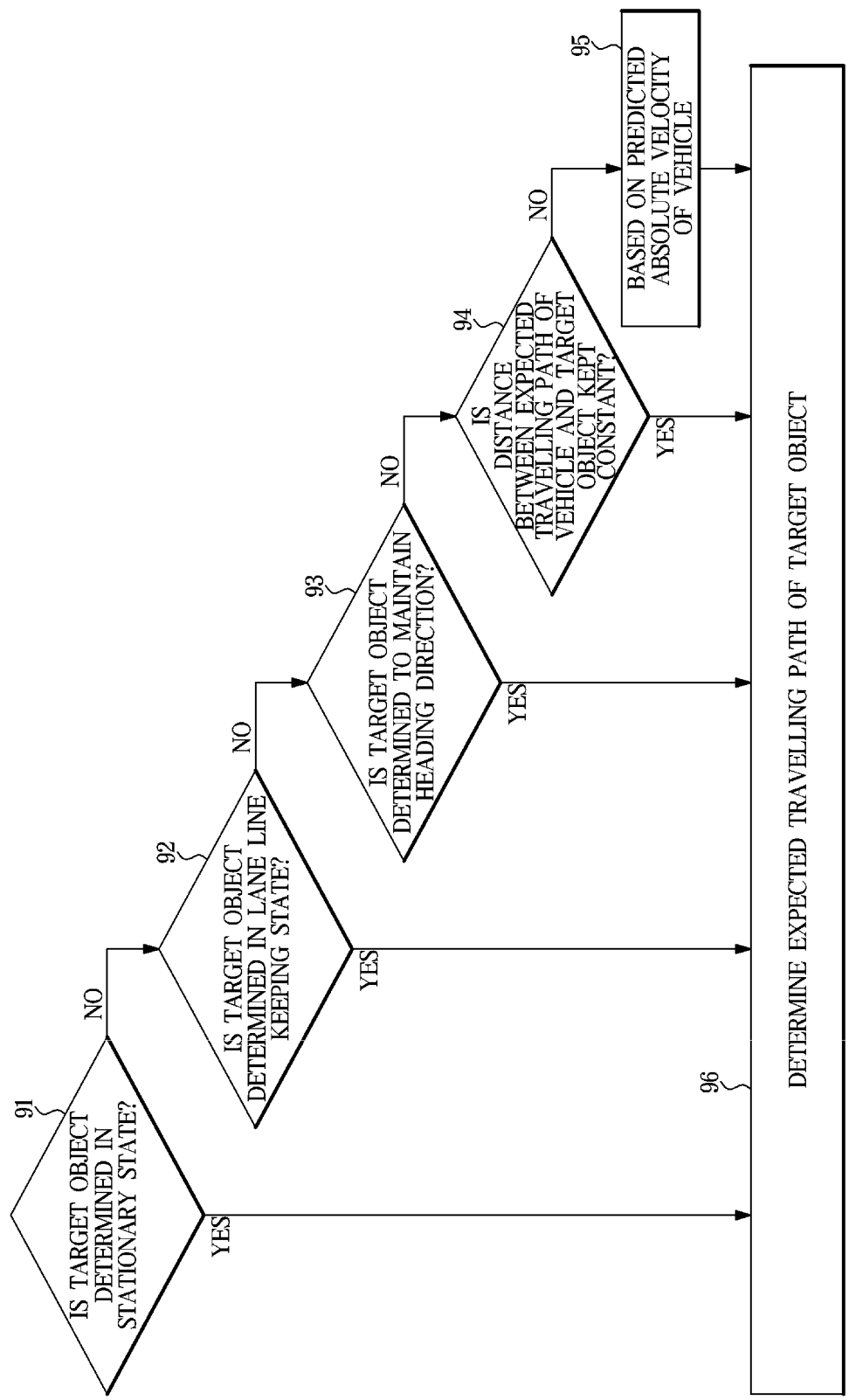
FIG. 11 is a diagram illustrating an example of an operation of determining an expected traveling path of a target object by placing the order of priority on traveling state determination of the target object according to an exemplary embodiment.

FIG. 11 is a diagram illustrating an example of an operation of determining an expected traveling path of a target object by placing the order of priority on traveling state determination of the target object. Referring to FIG. 11, under the assumption that information about a surrounding road of the vehicle includes information about lane lines on both sides of the vehicle 1, the controller 200 may be configured to predict an offset between the target object and the expected traveling path of the vehicle based on the expected traveling path of the vehicle and the position information of the target object, determine whether the offset between the target object and the expected traveling path of the vehicle is maintained constant based on a variation of the offset between the target object and the expected traveling path of the vehicle acquired from a predetermined previous point in time and a variation of the offset between the target object and the expected traveling path of the vehicle at a current point in time.

In addition, the controller 200 may be configured to calculate a variation of the heading direction of the target object 2, determine whether the heading direction of the target object 2 is maintained, based on the variation of the heading direction of the target object 2 and a variation of heading of the target object 2 acquired from a predetermined previous point in time point, determine a state in which an offset from a left lane line (Lh) or right lane line (Rh) of lane line information on both sides of the vehicle 1 to the target object 2 is maintained constant as a first state, determine a state in which a heading direction of the target object 2 is maintained as a second state, determine a state in which an offset between the expected traveling path of the vehicle 1 and the target object 2 is maintained constant as a third state, determine a state in which the target object 2 is stopped as a fourth state, determine a state in which the target object 2 is linearly traveling as a fifth state, set the order of priority on the first, second, third, fourth and fifth states, and predict the expected traveling path of the target object 2 based on the order of priority. A type state is a state including the first, second, and third states, and the type state may include all of the first, second, third, fourth, and fifth states, and may refer to a specific traveling state such as a state of an offset between the target object and the vehicle being maintained.

Referring to FIG. 11, first, whether the target object 2 is in a stationary state may be determined (91). In response to determining that the target object 2 is in a stationary state (YES in operation 91), the reliability of the expected traveling path of the vehicle 1 may be compared with a predetermined threshold value (herein, the threshold value may be different for each state of the target object 2), and in response to determining that the reliability of the expected traveling path of the vehicle 1 is equal to or greater than the predetermined threshold value, an expected traveling path of the target object 2 may be determined (96). When the target object 2 is not determined to be in a stationary state (NO in operation 91), whether the target object 2 is in a lane line keeping state may be determined (92), and when the target object 2 is determined to be in a lane line keeping state (YES in operation 92), the reliability of the expected traveling path of the vehicle 1 may be compared with a predetermined threshold value.

In response to determining that the reliability of the expected traveling path of the vehicle 1 is greater than the predetermined threshold value, an expected traveling path of the target object 2 may be determined (96). In response to determining that the reliability of the expected traveling path of the vehicle 1 is less than or equal to the predetermined threshold value, whether the heading direction of the target object 2 is maintained may be maintained (93). When the heading direction of the target object 2 is maintained (93) and the reliability of the expected traveling path of the vehicle 1 is greater than the predetermined threshold, an estimated traveling path of the target object 2 may be determined (96), and when the heading direction of the target object 2 is not maintained, whether the offset between the estimated traveling path of the vehicle 1 and the target object 2 is maintained constant may be determined.

In the same way as the above, whether the offset between the expected traveling path of the vehicle 1 and the target object 2 is maintained constant may be determined (94). In response to determining that the offset between the expected traveling path of the vehicle 1 and the target object 2 is maintained constant (YES in 94), the reliability of the expected traveling path of the vehicle 1 may be compared with a predetermined threshold value, and in response to determining that the reliability of the expected traveling path of the vehicle 1 is greater than or equal to the predetermined threshold value, an expected traveling path of the target object may be determined. Additionally, in response to determining that the reliability of the expected traveling path of the vehicle 1 is less than the predetermined threshold value, an expected traveling path of the target object 2 may be determined based on a predicted absolute velocity of the vehicle 1 (95). When the expected traveling path of the target object 2 is determined based on the predicted absolute velocity of the vehicle 1, the reliability of the expected traveling path of the vehicle 1 is not be compared with the threshold value.

Figure 12:
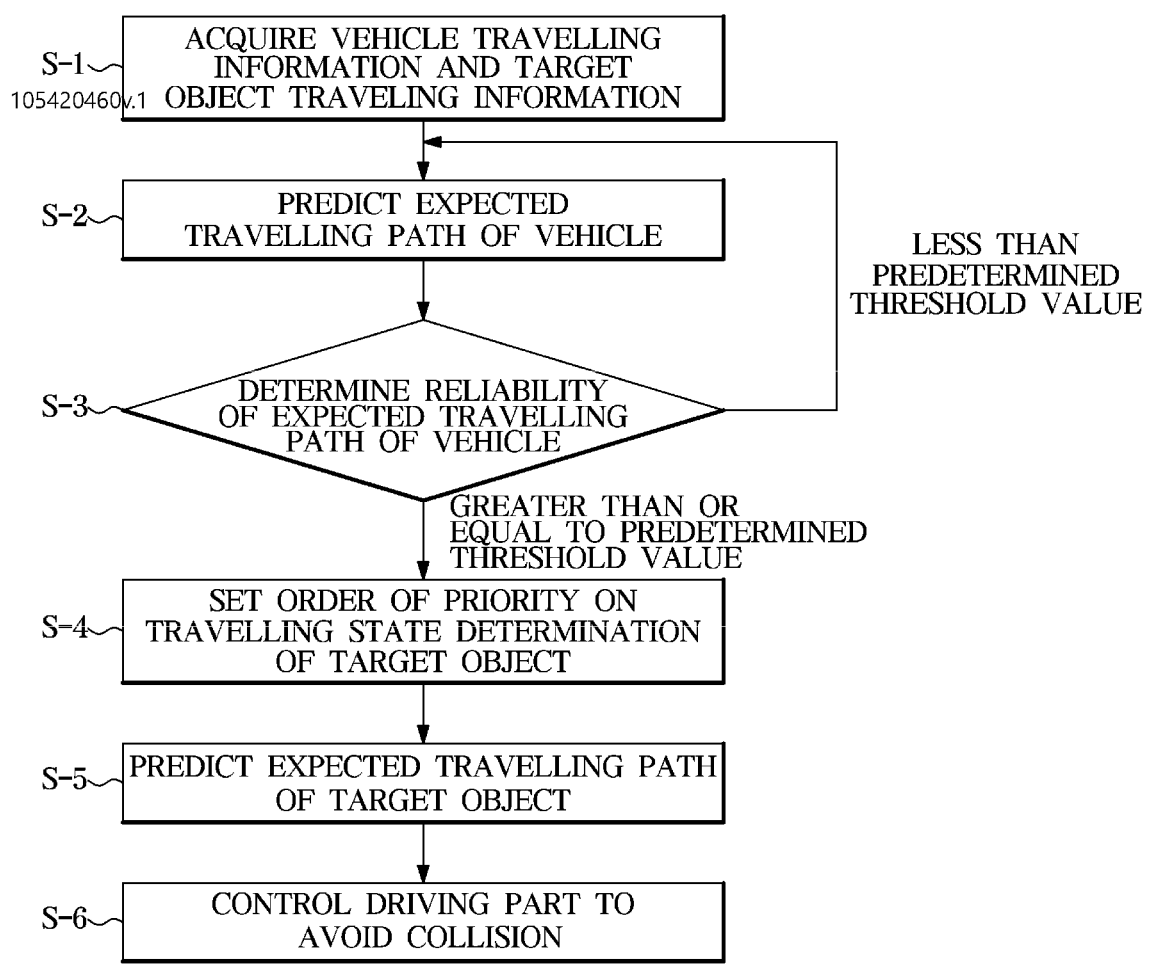
FIG. 12 is a flow chart according to an exemplary embodiment.

FIG. 12 is a flow chart according to an exemplary embodiment. Referring to FIG. 12, traveling information of the vehicle 1 and traveling information of the target object 2 may be acquired (S-1), an expected traveling path of the vehicle 1 may be predicted based on GPS data of the vehicle 1 and traveling information of the vehicle 1 (S-2), and the reliability of the expected traveling path of the vehicle 1 may be determined (S-3). The reliability may be determined based on the GPS data of the vehicle and the expected traveling path of the vehicle as described above. When the reliability is less than a predetermined threshold value, the expected traveling path of the vehicle 1 may be predicted again, and when the reliability is greater than or equal to the predetermined value, the order of priority may be set on traveling state determination of the target object 2 (S-4). Thereafter, based on the order of priority, the expected traveling path of the target object 2 may be predicted (S-5), and the driving part 500 may be operated to avoid a collision between the vehicle 1 and the target object 2 that is predicted to occur (S-6).

Meanwhile, the disclosed exemplary embodiments may be embodied in the form of a recording medium storing instructions executable by a computer. The instructions may be stored in the form of program code and, when executed by a processor, may generate a program module to perform the operations of the disclosed exemplary embodiments. The recording medium may be embodied as a non-transitory computer-readable recording medium. The non-transitory computer-readable recording medium includes all types of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, the vehicle and the method of controlling the same may predict a collision by predicting the expected traveling path of the vehicle and the expected traveling path of the target object, and avoid the predicted collision.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

What is claimed is:

1. A vehicle comprising:
   a first sensor part configured to acquire vehicle travelling information including position information, velocity information, and heading direction information of a vehicle;
   a second sensor part configured to acquire target object travelling information including position information, velocity information, heading value information of a target object, and surrounding road information of the vehicle;
   a controller configured to:
      predict an expected travelling path of the vehicle on the basis of the vehicle travelling information;
      determine a reliability of the expected travelling path of the vehicle on the basis of a learning table that is generated by learning based on the expected travelling path of the vehicle, global positioning system (GPS) data of the vehicle, and an internal signal of the vehicle;
      confirm an expected travelling path of the target object in real time on the basis of the target object travelling information in response to the reliability of the expected travelling path of the vehicle being greater than or equal to a predetermined threshold value; and
      control the vehicle to avoid a collision between the vehicle and the target object on the basis of the expected travelling path of the vehicle and the confirmed expected travelling path of the target object.

2. The vehicle of claim 1, wherein the controller predicts an absolute velocity of the target object on the basis of the vehicle travelling information and the target object travelling information.

3. The vehicle of claim 2, wherein the sensor part includes a camera, a radar, and a Lidar, wherein the controller is configured to:
   determine a first heading value of the target object using at least one of the camera, the radar, or the Lidar included in the second part on the basis of the position of the target object;
   determine a second heading value of the target object on the basis of the absolute velocity; and
   predict a heading direction of the target object on the basis of the first heading value of the target object and the second heading value of the target object.

4. The vehicle of claim 1, wherein the controller is configured to:
   predict an offset between the target object and the expected travelling path of the vehicle on the basis of the expected travelling path of the vehicle and the position information of the target object;
   predict a first collision point between the vehicle and the target object in response to the offset being less than a predetermined first value; and
   control the vehicle to avoid a collision with the target object in response to a difference in times for the vehicle and the target object to reach the first collision point being less than a predetermined second value.

5. The vehicle of claim 1, wherein the surrounding road information of the vehicle includes lane line information on both sides of the vehicle,
   wherein the controller is configured to:
      predict an offset between a left lane line or right lane line of the lane line information on the both sides of the vehicle and the target object;

predict a second collision point between the vehicle and the target object in response to the offset being less than a predetermined first value; and control a driving part to avoid a collision with the target object in response to a difference in times for the vehicle and the target object to reach the second collision point being less than a predetermined second value.

6. The vehicle of claim 2, wherein the controller is configured to:

determine a weight related to a longitudinal absolute velocity of the target object according to a position of the target object; and determine a longitudinal moving direction of the target object on the basis of the absolute velocity of the target object acquired from a predetermined previous point in time, the absolute velocity of the target object at a current point in time, and the weight.

7. The vehicle of claim 2, wherein the controller is configured to:

calculate a reference value on the basis of a lateral absolute velocity of the target object and a heading direction of the target object, and in response to the reference value being greater than or equal to a predetermined third value, determine that the target object performs traverse movement on the basis of the absolute velocity of the target object acquired from a predetermined previous point in time, the absolute velocity of the target object at a current point in time, and the vehicle travelling information.

8. The vehicle of claim 4, wherein the controller determines whether the offset between the target object and the expected travelling path of the vehicle is kept constant on the basis of a variation of the offset between the target object and the expected travelling path of the vehicle acquired from a predetermined previous point in time and a variation of the offset between the target object and the expected travelling path of the vehicle acquired at a current point in time.

9. The vehicle of claim 5, wherein the controller determines whether an offset between the target object and the expected travelling path of the vehicle is kept constant on the basis of a variation of an offset between the target object and the left lane line or right lane line of the vehicle acquired from a predetermined previous point in time and a variation of the offset between the target object and the left lane line or right lane line of the vehicle acquired at a current point in time.

10. The vehicle of claim 3, wherein the controller is configured to:

calculate a variation of the heading direction of the target object; and determine whether the target object maintains the heading direction on the basis of a variation of heading of the target object acquired from a predetermined previous point in time and a variation of the heading direction of the target object.

11. The vehicle of claim 8, wherein the controller is configured to:

determine whether a heading direction of the target object is maintained;

determine whether the offset between the target object and the expected travelling path of the vehicle is kept constant;

determine a state in which an offset from a left lane line or right lane line of the lane line information on the both sides of the vehicle to the target object is kept constant as a first state;

determine a state in which the heading direction of the target object is maintained as a second state;

determine a state in which the offset between the expected travelling path of the vehicle and the target object is kept constant as a third state; and determine an order of priority of type states including the first, second, and third states and predict the expected travelling path of the target object based on the order of priority.

12. A method of controlling a vehicle, the method comprising:

acquiring vehicle travelling information including position information, velocity information, and heading direction information of a vehicle;

acquiring target object travelling information including position information, velocity information, heading value information of a target object, and surrounding road information of the vehicle;

predicting an expected travelling path of the vehicle on the basis of the vehicle travelling information;

determining a reliability of the expected travelling path of the vehicle on the basis of a learning table that is generated by learning based on the expected travelling path of the vehicle, global positioning system (GPS) data of the vehicle, and an internal signal of the vehicle;

confirming an expected travelling path of the target object in real time on the basis of the target object travelling information in response to the reliability of the expected traveling path of the vehicle being greater than or equal to a predetermined threshold value; and performing control to avoid a collision between the vehicle and the target object on the basis of the expected travelling path of the vehicle and the confirmed expected travelling path of the target object.

13. The method of claim 12, wherein the predicting of the expected travelling path of the target object in real time includes predicting an absolute velocity of the target object on the basis of the vehicle travelling information and the target object travelling information.

14. The method of claim 13, the avoiding of a collision between the vehicle and the target object includes:

determining a first heading value of the target object using at least one of a camera, a radar, or a Lidar on the basis of the position of the target object;

determining a second heading value of the target object on the basis of the absolute velocity; and predicting a heading direction of the target object on the basis of the first heading value of the target object and the second heading value of the target object.

15. The method of claim 12, wherein the predicting of the expected travelling path of the target object in real time includes:

predicting an offset between the target object and the expected travelling path of the vehicle on the basis of the expected travelling path of the vehicle and the position information of the target object;

predicting a first collision point between the vehicle and the target object in response to the offset being less than a predetermined first value; and allowing a collision between the vehicle and the target object to be avoided in response to a difference in times for the vehicle and the target object to reach the first collision point being less than a predetermined second value.

16. The method of claim 12, wherein the avoiding of a collision between the vehicle and the target object includes:
acquiring the surrounding road information of the vehicle including lane line information on both sides of the vehicle;
predicting an offset between a left lane line or right lane line of the lane line information on the both sides of the vehicle and the target object;
predicting a second collision point between the vehicle and the target object in response to the offset being less than a predetermined first value; and
performing control to avoid a collision with the target object in response to a difference in times for the vehicle and the target object to reach the second collision point being less than a predetermined second value.

17. The method of claim 13, wherein the predicting of the expected travelling path of the target object in real time includes:
determining a weight related to a longitudinal absolute velocity of the target object according to a position of the target object; and
determining a longitudinal moving direction of the target object on the basis of the absolute velocity of the target object acquired from a predetermined previous point in time, the absolute velocity of the target object at a current point in time, and the weight.

18. The method of claim 13, wherein the predicting of the expected travelling path of the target object in real time includes:
calculating a reference value on the basis of a lateral absolute velocity of the target object and a heading direction of the target object, and
in response to the reference value being greater than or equal to a predetermined third value, determining that the target object performs traverse movement on the basis of the absolute velocity of the target object acquired from a predetermined previous point in time, the absolute velocity of the target object at a current point in time, and the vehicle travelling information.

19. The method of claim 15, wherein the predicting of the expected travelling path of the target object in real time includes determining whether the offset between the target object and the expected travelling path of the vehicle is kept constant on the basis of a variation of the offset between the target object and the expected travelling path of the vehicle acquired from a predetermined previous point in time and a variation of the offset between the target object and the expected travelling path of the vehicle acquired at a current point in time.

20. The method of claim 16, wherein the predicting of the expected travelling path of the target object in real time includes determining whether an offset between the target object and the expected travelling path of the vehicle is kept constant on the basis of a variation of an offset between the target object and the left lane line or right lane line of the vehicle acquired from a predetermined previous point in time and a variation of the offset between the target object and the left lane line or right lane line of the vehicle acquired at a current point in time.

21. The method of claim 14, wherein the predicting of the expected travelling path of the target object in real time includes:
calculating a variation of a heading direction of the target object; and
determining whether the target object maintains the heading direction on the basis of a variation of heading of the target object acquired from a predetermined previous point in time and a variation of the heading direction of the target object.

22. The method of claim 18, wherein the predicting of the expected travelling path of the target object in real time includes:
determining whether the heading direction of the target object is maintained;
determining whether the offset between the target object and the expected travelling path of the vehicle is kept constant;
determining a state in which an offset from a left lane line or right lane line of the lane line information on the both sides of the vehicle to the target object is kept constant as a first state;
determining a state in which the heading direction of the target object is maintained as a second state;
determining a state in which the offset between the expected travelling path of the vehicle and the target object is kept constant as a third state; and
determining an order of priority of type states including the first, second, and third states and predicting the expected travelling path of the target object based on the order of priority.

* * * * *